UNITED STATES PATENT OFFICE.

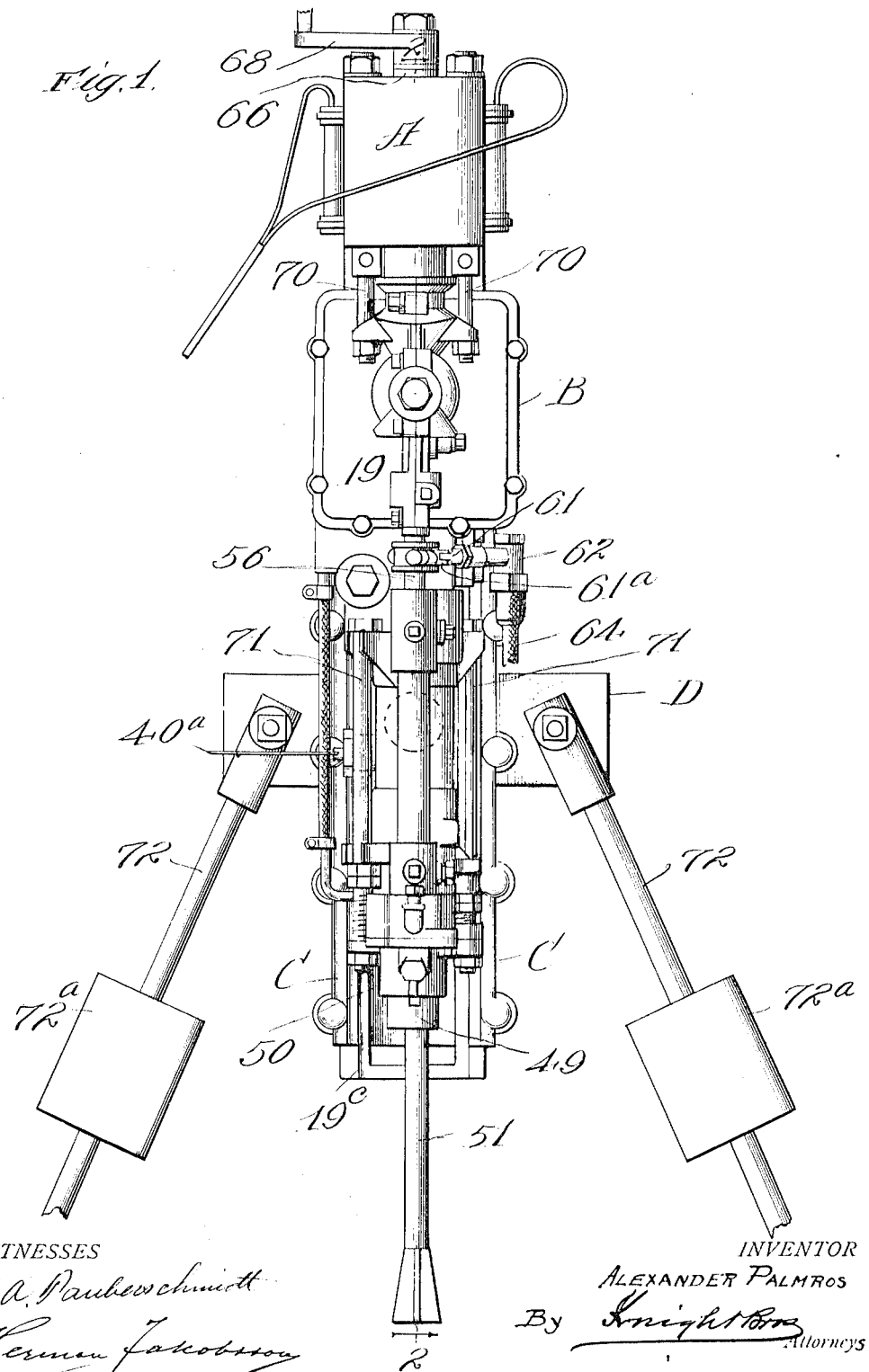

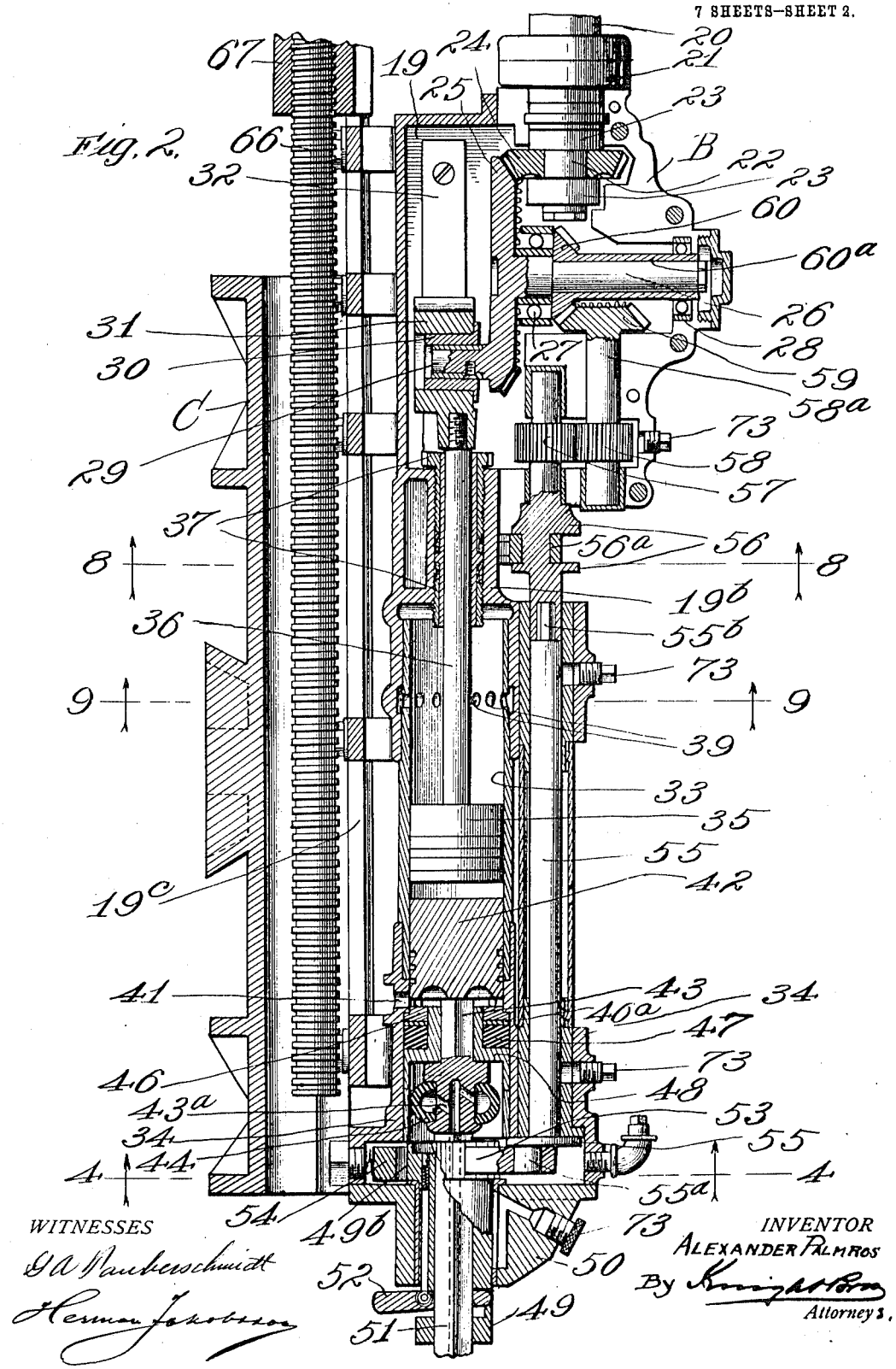

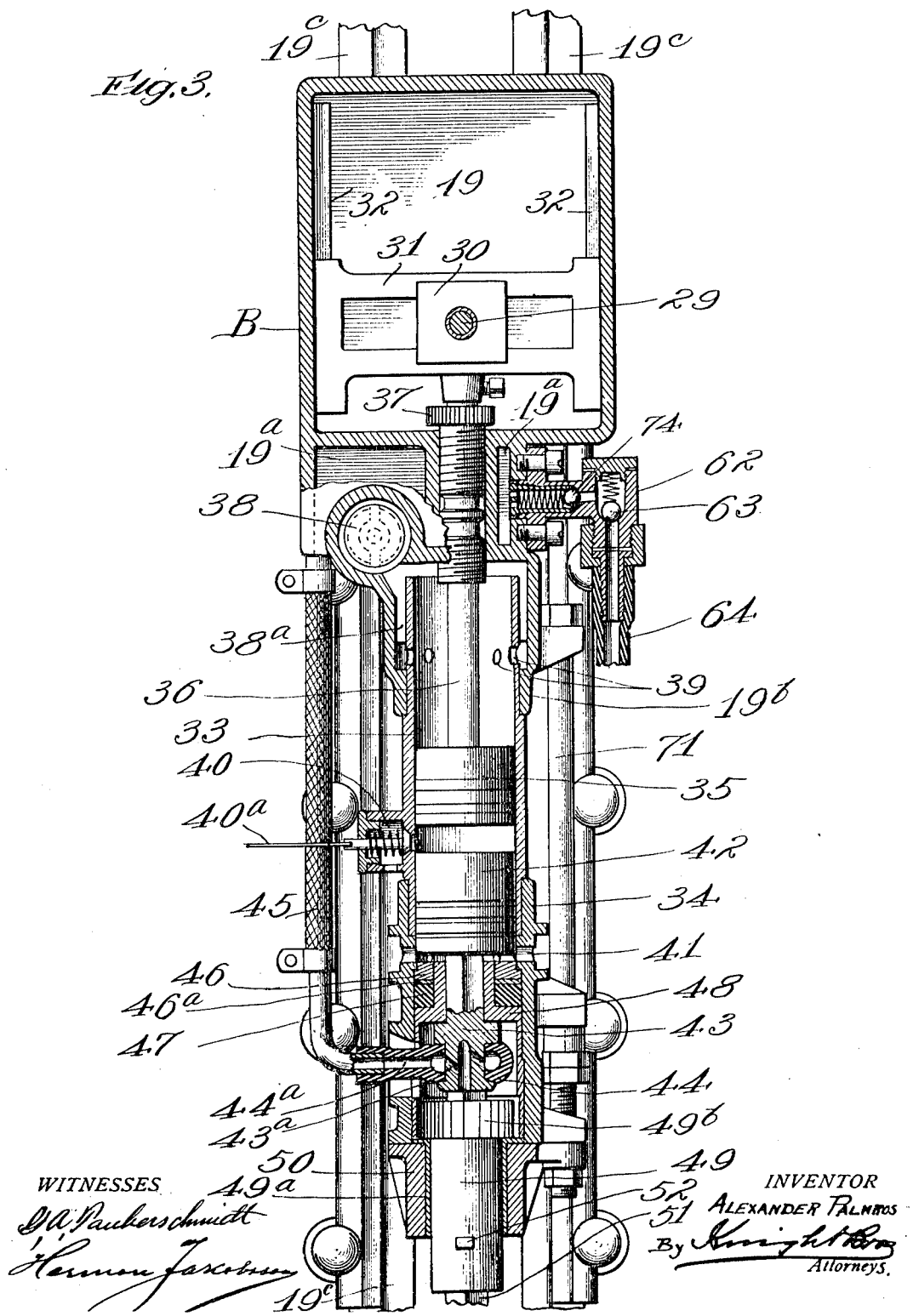

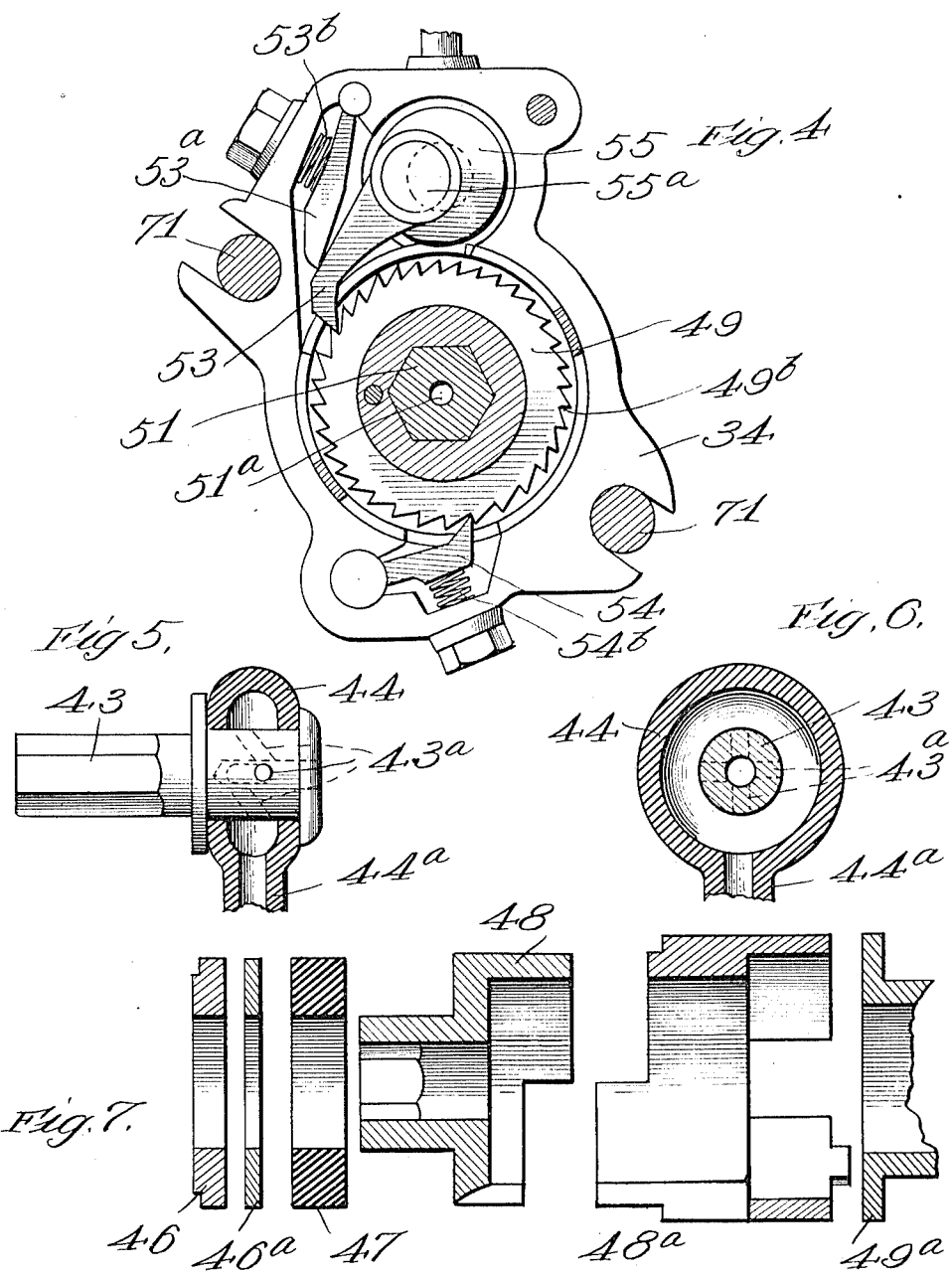

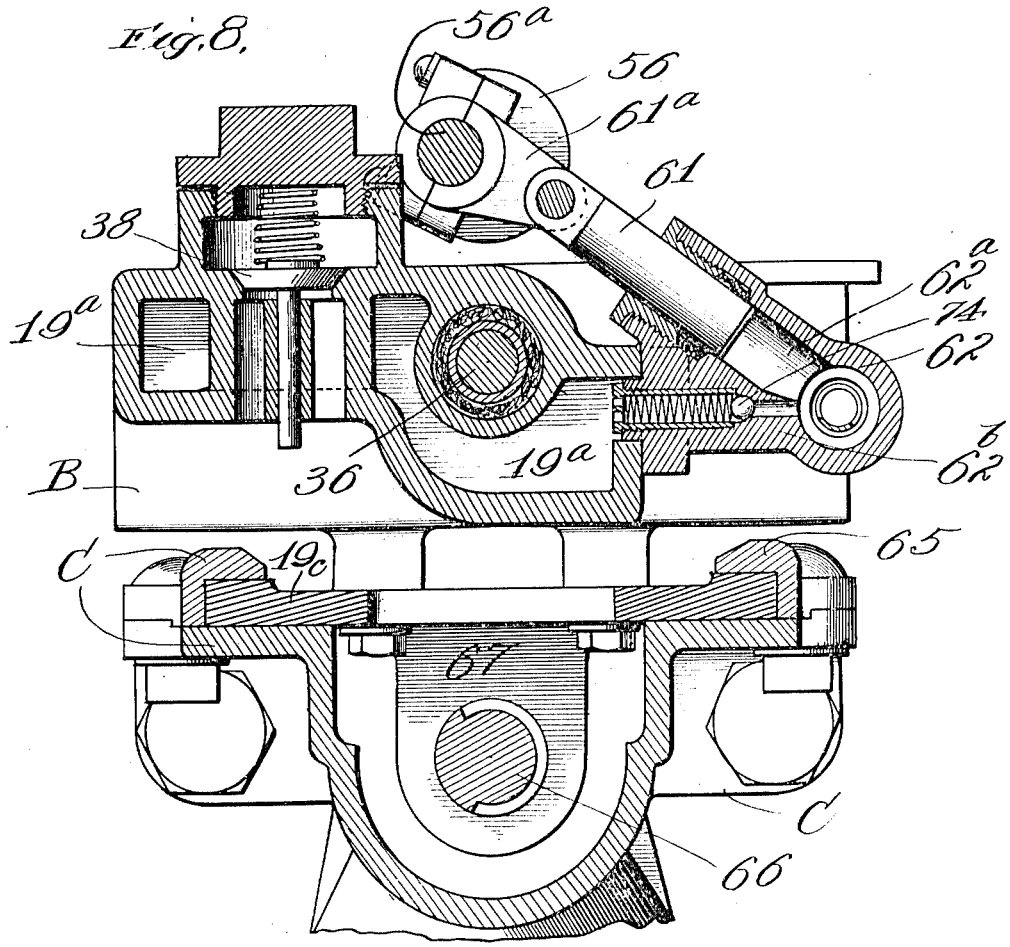
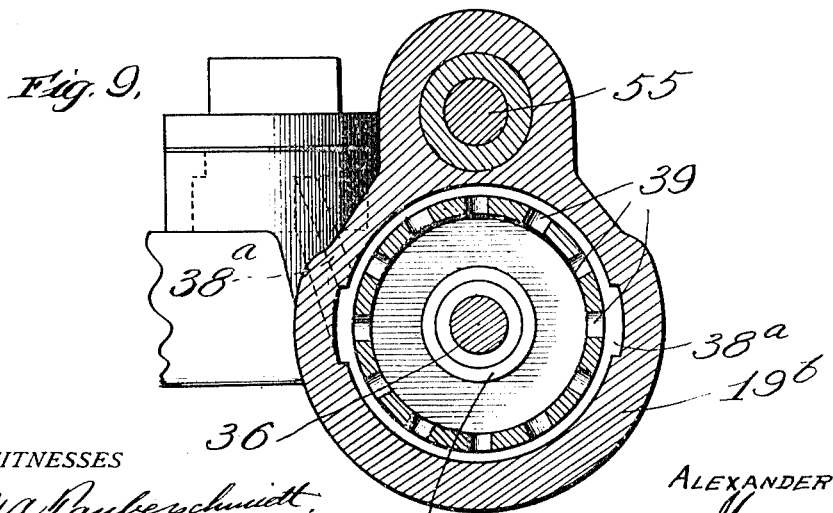

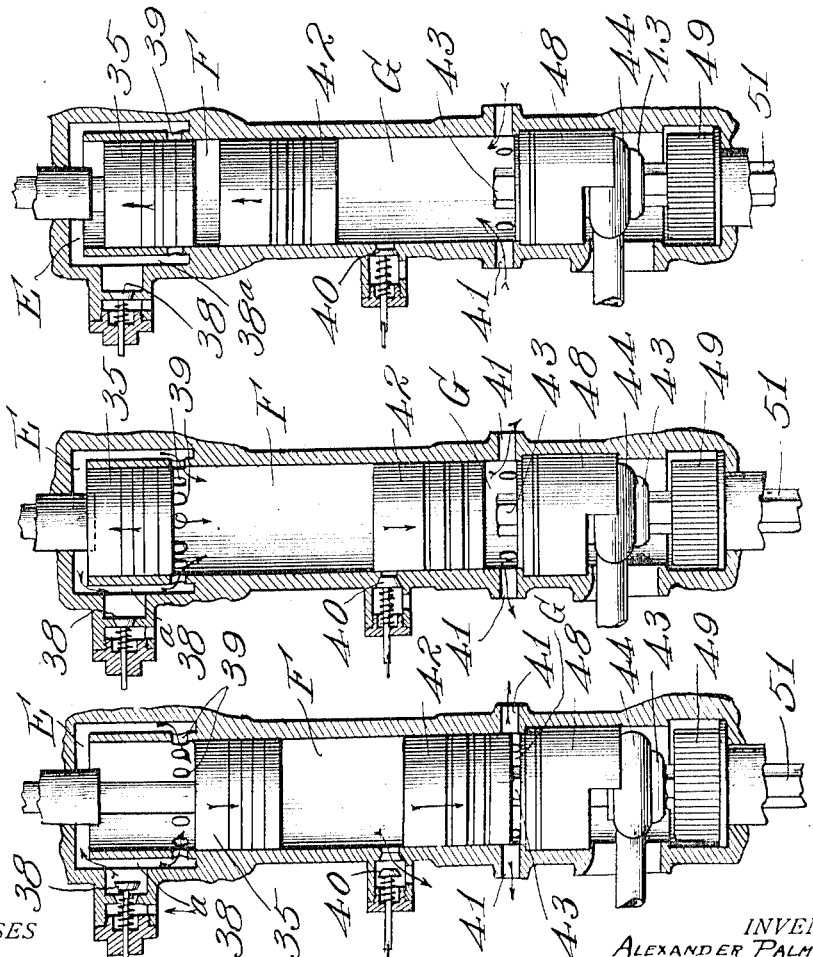

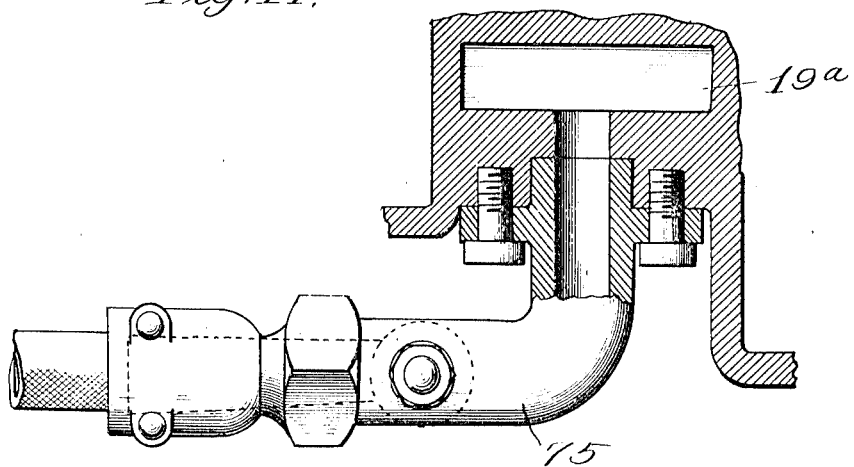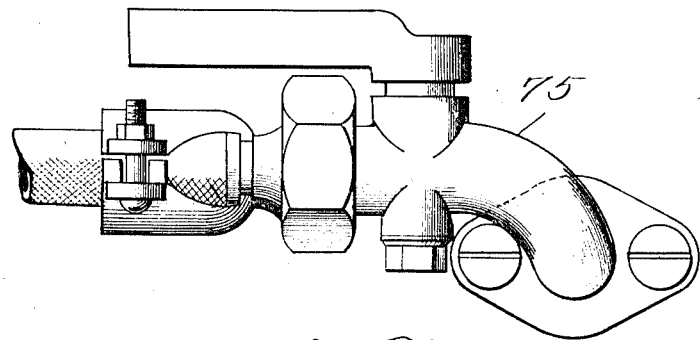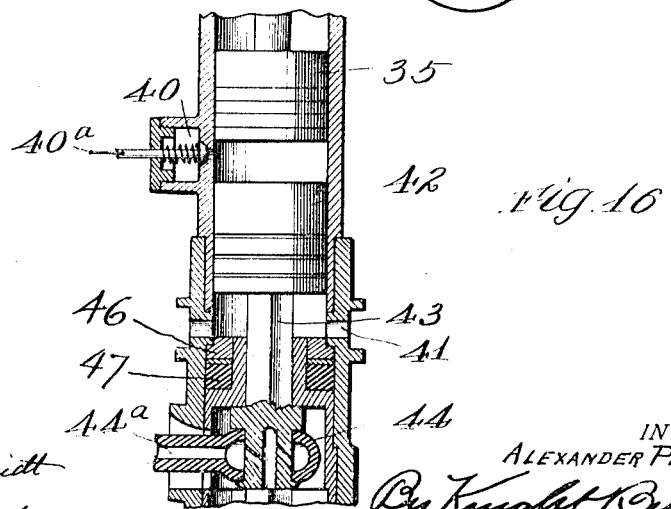

ALEXANDER PALMROS, OF SYRACUSE, NEW YORK, ASSIGNOR TO THE PNEUMELECTRIC MACHINE COMPANY, OF SYRACUSE, NEW YORK, A CORPORATION OF NEW YORK.

ROCK-DRILL WITH WATER-FEED.

1,072,359.      Specification of Letters Patent.      Patented Sept. 2, 1913.

Application filed July 1, 1912. Serial No. 707,051.

*To all whom it may concern:*

Be it known that I, ALEXANDER PALMROS, a citizen of Finland, and resident of Syracuse, in the county of Onondaga and State of New York, have invented certain new and useful Improvements in Rock-Drills with Water-Feed, of which the following is a specification.

This invention relates to percussion tools in which the fluid pressure medium developed in the machine, is caused to act against a reciprocating hammer to develop the working stroke therein, the pressure in said medium being developed by means of a motor driven piston during its retracting stroke, when simultaneously the piston exercises retracting influence over the hammer. At the end of the retracting stroke the pressure medium is suddenly released in the space between the piston and the hammer, acting expansively against the latter to develop the working stroke. The hammer thereupon delivers a sharp blow to the bit or drill steel.

One object of this invention is to supply a water feed to the drill steel or hollow bit in order to cool the bit and keep the cutting face clean. As the water is forced through the bit it tends to eject all chips of cutting from the hole in the rock.

Another object of this invention is the turning of the bit, whereby each blow is delivered with the bit in a different position and this turning is intermittent and not continuous.

Still another part of this invention, in one of the disclosed embodiments, is the novel relation between the hammer, its cushion and the cylinder, according to which, should, for instance, a blow be delivered by the hammer when the tool is out, or not against the rock, the hammer will not strike with its full force against the yielding washer, in the forward end of the cylinder, but the blow delivered will be deadened, by developing behind the hammer, a partial vacuum which subjects its forward face to sufficient atmospheric pressure to materially overcome the stored energy before the hammer reaches the cushion.

Although the machine may be operated at any angle from perpendicularly downward to perpendicularly upward, the parts will in the following be described as regards location as represented in the drawings for drilling a hole downward in a rock.

In the accompanying drawings one embodiment of the invention has been illustrated, and Figure 1 shows a front elevation of a rock drill set upon a tripod; Fig. 2 is a vertical section on line 2—2 of Fig. 1; Fig. 3 is another vertical section of Fig. 1 approximately on its center line and looking in the same direction as Fig. 1; Fig. 4 is a cross section on line 4—4 of Fig. 2 looking upward; Figs. 5 and 6 are respectively side elevations partly in section and a cross section of the dolly pin and the bulb; Fig. 7 is a longitudinal section of the details of the cushioning device; Fig. 8 is a cross section on line 8—8 of Fig. 2, looking upward; Fig. 9 is still another cross section on line 9—9 of Fig. 2, looking upward; Fig. 10 is a longitudinal section of the working cylinder; Fig. 11 is a diagrammatical view of the working cylinder showing the position of the parts during the retracting stroke; Fig. 12 is a similar view to Fig. 11 showing the relative position of the parts at the moment of the turning of the piston; Fig. 13 is a similar view to Fig. 11 showing the relative position of the parts during the forward stroke of the piston; Fig. 14 is a top plan view, partly in section of hose connection without pump; Fig. 15 is a side elevation of Fig. 14; and Fig. 16 shows in section a part of the working cylinder with a modification of the dolly pin.

Referring particularly to Figs. 1, 2 and 3, A represents an electric motor; B the main housing of the gears, piston, hammer, drill and chuck, etc.; C a frame or guide upon which the housing with the motor is made to slide during the forward feeding of the machine and D is the stand, shown here as a tripod, supporting the machine. The motor A is rigidly secured to the main housing B and the motor-shaft 20 engages the driving shaft 22 by means of a coupling 21. This might be an ordinary direct jaw clutch, or a speed reducing gear. The driving shaft 22 is carried in bearings 23 in the gear case 19, and has secured thereto the beveled gear 24, which latter is in mesh with the gear wheel 25. The shaft 26 carrying the gear wheel 25 is running in bearings 27 and 28 which, in the drawing, are shown as being supplied with balls, said bearings being seated in the gear case 19. On one side of the wheel 25 is a crank pin eccentrically located engaging a slipper 30, which is constructed to run transversely in a cross head 31. The latter runs in the longitudinal direction of the machine on guides 32 which are part of, or securely attached on the inside of the gear case 19. The revolving motion of the motor and the gears is consequently transferred into a rectilinear motion of the cross head 31 in the longitudinal direction of the machine.

33 is the working cylinder which with one end is seated in the rear head 19$^b$ constituting an extension of the gear case 19. The opposite or lower end of the cylinder is seated in the dolly case 34, at the end of which is to be found the front head 50. The cylinder 33, dolly-case 34 and the front head 50 are all rigidly secured to the gear case 19 by means of connecting bolts 71, thus making up the main housing B. Within the cylinder 33 is located the driving piston 35 with its rod extending through the stuffing box 37. The end of the rod is screwed into, or in any other manner secured to the cross head 31, whereby the rod and piston always participate in any movement given to the cross head. Below the piston 35 and having the same diameter as the piston is to be found the hammer 42 located in the cylinder 33. This hammer has no direct connection with any other part but receives its reciprocating movement from the piston 35 through the pressure medium.

38 is an inlet valve having communication with the upper end of the cylinder and with the port holes 39 through the by-passes 38$^a$, see also Fig. 9, and 40 is an escape valve for the pressure medium, opening into the cylinder through port 33$^a$ adjacent the upper end of the hammer when the hammer is in its lowest position after having delivered a blow. This valve may be hand operated by pulling at the strap 40$^a$. In the dolly-case 34 at the lower end of the hammer when in its lowest position are situated radial exhaust ports 41 for the pressure medium. These last named ports also serve as intake ports on the retracting or upstroke of the hammer.

Directly underneath the hammer the dolly pin 43, see also Figs. 5 and 6, is seated in its sleeve 48, 48$^a$. This dolly sleeve is made in two parts, one upper one 48 and a lower one 48$^a$ to facilitate assembling. The dolly-pin is hollowed out in the center, see Figs. 5 and 6, and has inclined radial port openings 43$^a$ from the center to its periphery and over its head portion is slipped a rubber bulb 44 with an annular chamber and a shank portion 44$^a$ which projects through the side of the sleeve 48 and dolly-case 34. Attached to the shank 44$^a$ of the bulb is a hose 45 the other end of which is connected to the water chamber 19$^a$ in the gear case 19.

The narrow part of the sleeve 48, see Fig. 7, which serves as a guide and incloses the shank of the dolly-pin 43 has around it a spring, leather or rubber cushion 47 which abuts at the lower end against the shoulder on the sleeve 48 and on top of the cushion lie a couple of metal washers 46 and 46$^a$. In the front head 50 is carried a chuck 49 in a bushing 49$^a$ and projecting with its sleeve portion through the end of the front head. This chuck is mounted in the head 50 so as to be able to rotate around its axis receiving its movement through a ratchet gear which will be described farther on. The bit or drill steel 51, which is preferably of an octagonal or hexagonal cross section, has a duct 51$^a$ drilled throughout its length and in the center thereof. The drill steel is retained in position by means of a clamping plate 52 in such a manner that it can be pushed in without hindrance, but will not fall out or be drawn out if a pull is exerted at its free end. This clamping arrangement being the subject of a separate invention will not be described more in detail in this application.

The head of the chuck 49 which is located inside of the dolly-case 34 is provided circumferentially with ratchet teeth 49$^b$. Acting on these and always pushing the chuck in the same direction, giving it intermittent rotation, is the ratchet pawl 53, see particularly Fig. 4. The ratchet pawl 53 is pushed inwardly by a pivoted tongue 53$^a$ which is actuated by a spring 53$^b$. This ratchet pawl is pivoted on the crank pin 55$^a$ located eccentrically at one end of the rotating shaft 55 from which it receives its movement. A lock pawl 54 located diametrically opposite the ratchet pawl 53 in the dolly-case 34 tends to retain the chuck 49 in its position while the ratchet pawl 53 is being retracted. This lock pawl 54 is actuated by a spring 54$^b$ which presses the pawl against the ratchet teeth 49$^b$.

The rotating shaft 55 receives its motion from a crank shaft 56 in a socket of which the small end 55$^b$ of the rotating shaft is keyed. The crank shaft 56 is rotated by means of a pinion 57, and spur gear 58 which latter is secured to shaft 58$^a$ and pinion 57 on shaft 56. This shaft again is actuated by a pair of miter gears, one of which 59 is secured at one end of shaft 58$^a$ and the other 60 on the sleeve 60$^a$ which latter is keyed to shaft 26 of bevel gear 25. The shafts 58$^a$ and 56 run in bearings in the main housing B.

On shaft 56 is a crank portion 56$^a$ near its middle and around this crank part revolves the connecting rod 61$^a$, see Fig. 8 which is at its other end hinged to the pump plunger 61. This plunger 61 is by this means reciprocated in its chamber 62ª of the pump housing 62. The passage 62ᵇ leads from the chamber 62ª into the water chamber 19ª mentioned above in the gear case 19, and has a pump valve 74 to prevent back flow of water. The pump housing 62 is connected to a water supply through the hose 64 and the pump valve 63. When the pump is in action, water will consequently be carried from this supply through hose 64, valves 63, passage 62ᵇ, water chamber 19ª, hose 45, shank 44ª and rubber bulb 44 through port openings 43ª into the hollow drill steel or bit.

The reason for having the stuffing box 37 and the inlet valve 38 built into the chamber 19ª, is to cool these parts by the stream of water passing by. It is, in particular, very important to keep the air inlet cool, otherwise the air will enter at a temperature that will permit it to cool and contract as soon as it reaches the cylinder, and the cylinder will not be filled at each stroke. When the drill is used in places where water under pressure is available, the pump 61, 62 is unnecessary and a hose connection 75, illustrated in Figs. 14 and 15, is then used for direct connection with the water main.

The feeding forward or downward, as the case may be, of the main housing B and with it the drill, is accomplished by means of a feed screw 66 turned by a crank handle 68 and revolving in a nut 67 located on the housing. This housing B is provided with runners 19ᶜ to guide it longitudinally in the guideways 65 of the frame C, see particularly Fig. 8. The motor can easily be detached from the main housing B by disconnecting bolts 70. When the rock drill is used in upright, or nearly upright position, a stand illustrated in Fig. 1 is generally used. This stand D is here shown as a tripod supported on legs 72 and held down by weights 72ª. 73 are oil plugs for lubricating the turning parts.

The device is operated in the following manner, reference being particularly made to Figs. 11, 12 and 13 and the part E of the cylinder above the piston 35 is to be designated as the compression chamber, the part F of the cylinder between the piston and the hammer, the expansion chamber and the part G of the cylinder below the hammer to be called the atmospheric pressure chamber. Starting from the position indicated in Fig. 3 with both the piston and the hammer in the forward position when the chambers E, F and G all may be considered to have atmospheric pressure, if the motor is now started it will draw the piston upward by means of sundry gears when the air in chamber F will be rarefied until the hammer 42 also is drawn upward, see Fig. 11, fresh air in the meantime passing into the chamber G through ports 41.

Simultaneously the air above piston 35, having no outlet, will be compressed. As soon as piston 35 on its upward or compression and retracting stroke has passed the port holes 39 in the cylinder, see Fig. 12, the compressed air from chamber E will rush through by-passes 38ª and port holes 39 into expansion chamber F thereby giving a sudden impulse to hammer 42, the air below the hammer then rushing out through ports 41. The hammer will thereupon strike the dolly-pin 43 which, in its turn, imparts a blow to the drill. The piston 35 now starts downward, which will cause a suction in the chamber E as soon as port holes 39 are closed by the piston 35. Air is then drawn in through the inlet valve 38 into the chamber E while the air in the chamber F escapes through valve 40. The cycle of operation is thereupon repeated. Should it happen that the drill steel or bit 51 does not touch solid rock, or if it were broken or taken out altogether, when a blow is delivered by hammer 42, the upper end of the dolly-pin would fall below the top surface of washer 46. As a consequence the blow would be struck against the washer by the hammer 42 instead and be cushioned or deadened by cushion 47 so that no injury to the parts can take place. The rotation of the drill and the chuck takes place intermittently as already described and is timed so that the drill is turned a small angle during the retraction of the hammer. It can readily be seen from the construction of the machine that the turning takes place only once for each stroke of the piston because the gears 59 and 60 are miters and the spur wheels 57, 58 are both of the same diameter and consequently the shaft 55 will revolve once during the completion of each stroke of piston 35. As the pump always is operated by shaft 55 through crank 56ª, the plunger of the pump also makes only one stroke for each stroke of the piston 35. The compression stroke of the plunger is then timed so that the squirting of the water through the drill steel takes place immediately after the blow has been delivered thereon, thereby rinsing out all loose material from the hole in the rock and also keeping the drill cool. The gear case is water tight and the gears all run in oil. If it should be desired to revolve the bit without hammering thereon, as for instance when retracting the bit out of the rock; the valve strap 40ª need only be pulled, when the pressure medium escapes through valve 40, and the hammer remains at rest while the motor and gears are still running. As valve 40 is situated slightly forward of piston 35 in its foremost position, an air cushion would be formed between the piston and the hammer 42, should the latter rebound.

In the modification illustrated in Fig. 16, the shank of the dolly pin 43 extends far into the cylinder, so that in case of the breaking of the pin or the drill, the hammer 42 would have a greater distance to travel before reaching the cushioned washer 46. A partial vacuum would then be created between the two pistons which will considerably lessen the blow on the washer.

I claim:—

1. In a rock drill and a housing therefor, the combination with a reciprocating hammer in the housing, a drill steel and a chuck for said steel, of a dolly pin situated between the hammer and the drill steel, a duct in the drill steel and a corresponding duct in the dolly pin, an elastic bulb inclosing part of the dolly pin, a hollow chamber in said bulb communicating with the duct in said dolly pin and connection for supplying water under pressure to said chamber.

2. In a rock drill and a housing therefor, the combination with a cylinder in said housing, a hammer operating in said cylinder, a drill steel and a duct for said drill steel, of a dolly pin located between the hammer and the drill steel, said dolly pin communicating the blow from the hammer to the drill steel, a duct in the drill steel and registering therewith, a duct in the dolly pin, passages connecting the periphery and the duct of said dolly pin, an elastic bulb surrounding said dolly pin and forming a water chamber therewith, a connection between said bulb and a water supply wherefrom water is forced through the bulb to the ducts in the dolly pin and the drill steel.

3. In a rock drill and a housing therefor, the combination with a cylinder in said housing, a hammer operating in said cylinder, a drill steel and a chuck for said drill steel; of a dolly pin located between the hammer and the drill steel, said dolly pin communicating the blow from the hammer to the drill steel, a duct in the drill steel and registering therewith, a duct in the dolly pin, passages connecting the periphery and the duct of said dolly pin, an elastic bulb surrounding said dolly pin and forming a water chamber therewith; a pump in said housing drawing water from the water supply, a hose connection between the pump and said chamber.

4. In a rock drill and a housing therefor, the combination with a cylinder in said housing, a hammer operating in said cylinder, a drill steel and a chuck for said drill steel; of a dolly pin located between the hammer and the drill steel, said dolly pin communicating the blow from the hammer to the drill steel, a duct in the drill steel and registering therewith, a duct in the dolly pin, passages connecting the periphery and the duct of said dolly pin, an elastic bulb surrounding said dolly pin and forming a water chamber therewith; a pump in said housing drawing water from a water supply, a hose connection between the pump and said water chamber, gearing for said pump adapted to operate the pump in order to deliver a quantity of water to the drill steel.

5. In a rock drill and a housing therefor, the combination with a cylinder in said housing, a hammer operating in said cylinder, a drill steel and a chuck for said drill steel; of a dolly pin located between the hammer and the drill steel, said dolly pin communicating the blow from the hammer to the drill steel, a duct in the drill steel and registering therewith, a duct in the dolly pin, passages connecting the periphery and the duct of said dolly pin, an elastic bulb surrounding said dolly pin and forming a water chamber therewith; a pump in said housing drawing water from a water supply and a hose connection between the pump and said water chamber; gearing for said pump adapted to operate synchronously with the strokes of the hammer and timed to deliver a quantity of water to the drill steel directly after said drill steel has received its blow.

6. In a rock drill and a housing therefor, the combination with a positively reciprocating piston, a cylinder in which said piston is reciprocated and a compression chamber at one end of said cylinder where said piston develops pressure; of a hammer operating in said cylinder and receiving its impulse from the pressure medium developed in said compression chamber, a drill steel and a chuck for said drill steel, a dolly pin located between the hammer and the drill steel, said dolly pin communicating the blow from the hammer to the drill steel, a duct in the drill steel and registering therewith, a duct in the dolly pin, passages connecting the periphery and the duct of said dolly pin, an elastic bulb surrounding said dolly pin and forming a water chamber therewith, a pump in said housing drawing water from a water supply, a hose connection between the pump and the water chamber, gearing for said pump adapted to operate the pump in order to deliver a quantity of water to the drill steel, common means for rotating said chuck and said pump gearing.

7. In a rock drill and a housing therefor, the combination with a positively reciprocating piston, a cylinder in which said piston is reciprocated, and a compression chamber at one end of said cylinder where said piston develops pressure, an inlet valve adjacent said compression chamber for admitting fluid thereto, a cooling chamber in said housing surrounding said inlet valve and said compression chamber, of a hammer operating in said cylinder receiving its impulse from the pressure medium developed in said compression chamber, a drill steel and a chuck for said drill steel, a dolly pin located between the hammer and the drill steel, said dolly pin communicating the blow from the hammer to the drill steel, a duct in the drill steel and registering therewith, a duct in the dolly pin, and passages connecting the periphery and the duct of said dolly pin, an elastic bulb surrounding said dolly pin and forming a water chamber therewith, a pump in said housing drawing water from a water supply and delivering it to said cooling chamber for the purpose of cooling said compression chamber and said inlet valve; a hose connection between said cooling chamber and said water chamber.

8. In a rock drill and a housing therefor, the combination with a positively reciprocating piston, a cylinder in which said piston is reciprocated, and a compression chamber at one end of said cylinder where said piston develops pressure, an inlet valve adjacent said compression chamber for admitting fluid thereto, a cooling chamber in said housing surrounding said inlet valve and said compression chamber, of a hammer operating in said cylinder receiving its impulse from the pressure medium developed in said compression chamber, a drill steel and a chuck for said drill steel, a dolly pin located between the hammer and the drill steel, said dolly pin communicating the blow from the hammer to the drill steel, a duct in the drill steel and registering therewith, a duct in the dolly pin and a passage connecting the periphery and the duct of said dolly pin, an elastic bulb surrounding said dolly pin and forming a water chamber therewith, a pump in said housing drawing water from a water supply and delivering it to said cooling chamber for the purpose of cooling said compression chamber and said inlet valve; a hose connection between said cooling chamber and said water chamber; gearing for said pump adapted to operate the pump in order to deliver a quantity of water first to said cooling chamber and subsequently to said drill steel.

9. In a rock drill and a housing therefor, the combination with a positively reciprocating piston, a cylinder in which said piston is reciprocated, and a compression chamber at one end of said cylinder where said piston develops pressure, an inlet valve adjacent said compression chamber for admitting fluid thereto, a cooling chamber in said housing surrounding said inlet valve and said compression chamber, of a hammer operating in said cylinder receiving its impulse from the pressure medium developed in said compression chamber, a drill steel and a chuck for said drill steel, a dolly pin located between the hammer and the drill steel, said dolly pin communicating the blow from the hammer to the drill steel, a duct in the drill steel and registering therewith, a duct in the dolly pin, and a passage connecting the periphery and the duct of said dolly pin, an elastic bulb surrounding said dolly pin and forming a water chamber therewith, a pump in said housing drawing water from a water supply and delivering it to said cooling chamber for the purpose of cooling said compression chamber and said inlet valve; a hose connection between said cooling chamber and said water chamber; gearing for said pump adapted to operate the pump in order to deliver a quantity of water first to said cooling chamber and subsequently to said drill steel; common means for operating said chuck and said pump gearing.

10. In a rock drill and a housing therefor, the combination with a positively reciprocating piston, a cylinder in which said piston is reciprocated, and a compression chamber at one end of said cylinder where said piston develops pressure, an inlet valve adjacent said compression chamber for admitting fluid thereto, a cooling chamber in said housing surrounding said inlet valve and said compression chamber, of a hammer operating in said cylinder receiving its impulse from the pressure medium developed in said compression chamber, a drill steel and a chuck for said drill steel, a dolly pin located between the hammer and the drill steel, said dolly pin communicating the blow from the hammer to the drill steel, a duct in the drill steel and registering therewith, a duct in the dolly pin and a passage connecting the periphery and the duct of said dolly pin, an elastic bulb surrounding said dolly pin and forming a water chamber therewith, a pump in said housing drawing water from a water supply and delivering it to said cooling chamber for the purpose of cooling said compression chamber and said inlet valve; a hose connection between said cooling chamber and said water chamber; gearing for said pump adapted to operate the pump in order to deliver a quantity of water first to said cooling chamber and subsequently to said drill steel; common means for operating said reciprocating piston and for rotating said chuck and said pump gearing.

The foregoing specification signed at Syracuse, N. Y., this tenth day of June, 1912.

ALEXANDER PALMROS.

In presence of—
C. GRACE KENTNER,
MARY ROSE ENGLISH.